(12) United States Patent
Yonezawa

(10) Patent No.: US 9,541,735 B2
(45) Date of Patent: Jan. 10, 2017

(54) IMAGING LENS

(71) Applicant: KANTATSU CO., LTD., Yaita-shi, Tochigi (JP)

(72) Inventor: Tomohiro Yonezawa, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/637,697

(22) Filed: Mar. 4, 2015

(65) Prior Publication Data

US 2015/0277086 A1  Oct. 1, 2015

(30) Foreign Application Priority Data

Mar. 25, 2014  (JP) .................................. 2014-061066

(51) Int. Cl.
  *G02B 13/18*  (2006.01)
  *G02B 13/00*  (2006.01)
  *G02B 13/06*  (2006.01)

(52) U.S. Cl.
  CPC ............. *G02B 13/004* (2013.01); *G02B 13/06* (2013.01)

(58) Field of Classification Search
  CPC ................................ G02B 13/04; G02B 13/18
  USPC .............. 359/747, 754, 771, 781, 753, 715, 708, 359/720, 745
  See application file for complete search history.

(56) References Cited

U.S. PATENT DOCUMENTS

| 4,525,038 | A | * | 6/1985 | Muller | ................... | G02B 13/04 |
| | | | | | | 359/753 |
| 2010/0246029 | A1 | * | 9/2010 | Asami | .................. | G02B 13/004 |
| | | | | | | 359/708 |
| 2011/0242683 | A1 | * | 10/2011 | Yamakawa | ............ | G02B 13/04 |
| | | | | | | 359/715 |
| 2014/0347494 | A1 | * | 11/2014 | Yamazaki | .............. | G02B 13/04 |
| | | | | | | 348/164 |

FOREIGN PATENT DOCUMENTS

| JP | 2009-128654 A | 6/2009 |
| JP | 2010-276752 A | 12/2010 |

* cited by examiner

*Primary Examiner* — James Greece
*Assistant Examiner* — Travis Fissel
(74) *Attorney, Agent, or Firm* — Oliff PLC

(57) ABSTRACT

A compact low-priced imaging lens which offers a field of view of about 180 degrees and high optical performance. The imaging lens for a solid-state image sensor includes, in order from an object side to an image side, a first lens with negative refractive power having a convex object-side surface and an aspheric image-side surface; a second lens with negative refractive power as a double-sided aspheric lens having a concave surface on the image side; a third lens with positive refractive power; an aperture stop; and a fourth lens with positive refractive power. The first and second lenses are made of plastic material. The imaging lens satisfies conditional expressions (1) and (2) below:

$-65.0 < f1/f < -17.0$ (1)

$0.04 < f2/f1 < 0.14$ (2)

(Continued)

where
f: focal length of the overall optical system of the imaging lens
f1: focal length of the first lens
f2: focal length of the second lens.

3 Claims, 10 Drawing Sheets

IMAGING LENS

The present application is based on and claims priority of Japanese patent application No. 2014-061066 filed on Mar. 25, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens which is built in image pickup devices mounted in in-vehicle cameras, game consoles, security cameras, information terminals such as PCs, and home appliances with a camera function.

In the present invention, in terms of lens surface shape, a convex surface and a concave surface refer to a paraxial shape (shape near an optical axis). The angle of deviation here means the angle between the incident ray and the emerging ray passing through a lens.

Description of the Related Art

In recent years, there has been a general tendency that vehicles and home appliances have a camera function for increased safety and convenience. For example, in a vehicle with a camera for photographing the area behind the vehicle, the driver can check on a monitor what is going on behind the vehicle, so that the vehicle can be driven back safely. Furthermore, vehicles with a camera capable of photographing the area around the vehicle in all directions (forward, backward, left, and right) have also been introduced into the market. In such vehicles, the driver can see the entire surroundings of the vehicle on the monitor as if viewed from above the vehicle, so very high visibility and safety are assured. On the other hand, in home appliances, for example, a camera mounted in an air conditioner can offer high convenience when it is used to monitor the room condition and get information on the number of people in the room so as to adjust the direction of air flow and the flow rate for power saving. It is expected that the demand for products with camera functions as mentioned above will grow in the future and new products to meet the demand will be developed at an accelerated pace.

The imaging lens mounted in such products is required to be compact and provide a wide field of view to cope with the function of the product, and deliver high imaging performance throughout the image. In addition, since there is an increasing tendency toward low-priced products, the imaging lens is also strongly expected to be supplied at a low price.

Conventionally, the imaging lens described in JPA-2009-128654 (Patent Document 1) and the imaging lens described in JP-A-2010-276752 (Patent Document 2) are known as examples of imaging lenses with a wide field of view.

Patent Document 1 discloses a fish-eye lens system which includes, in order from an object side, a first group with negative refractive power, a second group with positive refractive power, and a third group with positive refractive power, in which the first group includes, in order from the object side, a meniscus first lens with negative refractive power having a convex surface on the object side, a meniscus second lens with negative refractive power having a convex surface on the object side, and a biconcave third lens having a highly refractive surface on an image side, and the second group includes a fourth lens with positive refractive power having a highly refractive surface on the object side, an aperture stop, and a cemented lens having a fifth lens with positive refractive power, a biconcave sixth lens, and a seventh lens with positive refractive power, and the third group includes an eighth lens having a highly refractive surface on the object side.

Patent Document 2 discloses a wide-angle lens which includes, in order from an object side, a negative meniscus first lens having a concave surface on an image side, a negative meniscus second lens having a concave surface on the image side, a third lens with positive refractive power, an aperture stop, and a fourth lens with positive refractive power, in which the second lens is a single-sided aspheric lens and the fourth lens is a double-sided aspheric lens.

The imaging lens described in Patent Document 1 is a fish-eye lens with high optical performance which uses eight constituent lenses and offers relatively high brightness with an F-value of 2.8 and a field of view of 210 degrees or more. However, since it uses a relatively large number of constituent lenses and glass lenses and includes a cemented lens, its manufacturing cost is high. In addition, its total track length is 20 mm or more, so it cannot be compact enough.

The imaging lens described in Patent Document 2 is a compact wide-angle lens with high optical performance which uses only four constituent lenses and offers a relatively high brightness with an F-value of 2.6 and a field of view of 190 degrees or more. It uses glass material for the first and third lenses and plastic material for the second and fourth lenses, so that it can be supplied at a relatively low price. However, the negative meniscus first lens, located nearest to the object, has a large diameter and to manufacture it using glass material involves a high degree of processing difficulty, which is an obstacle in an attempt to decrease the manufacturing cost. In the imaging lens, if plastic material is used for the first lens, field curvature and astigmatism which are too serious to be corrected by the third and fourth lenses would occur and it would be difficult to deliver high optical performance.

SUMMARY OF THE INVENTION

The present invention has been made in view of the above problems and has an object to provide a compact low-priced imaging lens which offers a field of view of about 180 degrees and delivers high optical performance.

According to one aspect of the present invention, there is provided an imaging lens in which elements are arranged in the following order from an object side to an image side: a first lens with negative refractive power having a convex surface on the object side and an aspheric surface on the image side; a second lens with negative refractive power as a double-sided aspheric lens having a concave surface on the image side; a third lens with positive refractive power; an aperture stop; and a fourth lens with positive refractive power. The first lens and the second lens are made of plastic material, and the imaging lens satisfies conditional expressions (1) and (2) below:

$$-65.0 < f1/f < -17.0 \qquad (1)$$

$$0.04 < f2/f1 < 0.14 \qquad (2)$$

where f denotes the focal length of the overall optical system of the imaging lens, f1 denotes the focal length of the first lens, and f2 denotes the focal length of the second lens.

The imaging lens according to the present invention is of the so-called retro-focus type in which the first to fourth lenses arranged from the object side have negative, negative, positive and positive refractive power respectively and are divided into a front concave lens group (the first and second lenses) and a rear convex lens group (the third and fourth lenses). This lens configuration not only ensures a wide field of view, sufficient peripheral light intensity, and an appropriate back focus, but also offers an advantage in obtaining the telecentricity of light rays incident on the image sensor.

When an imaging lens having only four constituent lenses as in the present invention is intended to provide a wide field of view and high optical performance and its first and second lenses are made of plastic material, it is particularly important to reduce aberrations of off-axial light rays which occur on the concave lens group of the first and second lenses. The convex lens group, composed of the third and fourth lenses located nearer to the image plane, has to correct mainly off-axial aberrations such as astigmatism, field curvature, as well as spherical aberrations and coma aberrations. The important point is to design the concave lens group so as to reduce the burden on the convex lens group for correction of aberrations. For this reason, in the present invention, the image-side surface of the first lens and the object-side and image-side surfaces of the second lens are each designed to have an appropriate aspheric shape to correct aberrations in a balanced manner and improve optical performance.

In the above configuration, the first lens, which has negative refractive power and a convex object-side surface, captures light rays over a wide range and provides a wide field of view. The aspheric shape of the image-side surface minimizes the angle of deviation on the first lens to suppress off-axial aberrations, and controls the angle of light rays incident on the second lens within an appropriate range.

The second lens, a double-sided aspheric lens with negative refractive power having a concave surface on the image side, minimizes the angle of deviation of light rays passing through the second lens to suppress off-axial aberrations and guides the rays to the third lens, thereby making it easy to provide a wide field of view.

The third and fourth lenses, which both have positive refractive power, contribute to compactness of the imaging lens and are responsible for correction of various aberrations in the optical system and properly correct spherical aberrations, coma aberrations, astigmatism, and field curvature. The third lens also corrects chromatic aberrations which occur on the first lens and the second lens, and the fourth lens controls the angle of a chief ray incident on the image sensor.

The aperture stop, located between the third lens and the fourth lens, makes it easy to correct aberrations which increase as the field of view is widened.

The conditional expression (1) defines an appropriate range for the ratio of the focal length of the first lens to the focal length of the overall optical system, and indicates a condition to suppress aberrations of off-axial light rays and provide a wide field of view. If the value is above the upper limit of the conditional expression (1), the negative refractive power of the first lens would be stronger and thus it causes the angle of deviation on the first lens to increase and leads to off-axial aberrations which are too much for the rear convex lens group to correct, though it would be advantageous in widening the field of view. On the other hand, if the value is below the lower limit of the conditional expression (1), the negative refractive power of the first lens would be weaker and thus it causes the angle of deviation on the first lens to be too small to provide a wide field of view, though it would be advantageous in suppressing off-axial aberrations.

The conditional expression (2) indicates a condition to ensure the formability of the second lens and suppress off-axial aberrations which occur on the concave lens group and deliver high optical performance. If the value is above the upper limit of the conditional expression (2), the negative refractive power of the second lens in the concave lens group would be relatively weak and thus it becomes necessary to increase the negative refractive power of the first lens in order to provide a wide field of view. In that case, the uneven thickness ratio of the first lens (ratio of lens peripheral thickness to lens center thickness) would tend to be small and it would result in an increase in off-axial aberrations on the first lens, though the formability would be improved. On the other hand, if the value is below the lower limit of the conditional expression (2), the negative refractive power of the second lens in the concave lens group would be relatively strong and thus the uneven thickness ratio of the second lens would tend to be large, resulting in a tendency toward lower formability. Furthermore, off-axial aberrations on the second lens would increase and it would also be difficult to deliver high optical performance.

Preferably, in the imaging lens according to the present invention, the third lens is a meniscus lens with at least one aspheric surface having a concave surface on the image side, and the fourth lens is a biconvex lens with at least one aspheric surface having a convex surface on each of the object side and the image side.

The third lens, a meniscus lens with at least one aspheric surface which has a concave surface on the image side, corrects coma aberrations, astigmatism, field curvature, and chromatic aberrations with higher effectiveness. In addition, it gives telecentricity to the light rays passing through it and guides the rays to the fourth lens. The fourth lens, a biconvex lens with convex object-side and image-side surfaces, has strong positive refractive power distributed to the object-side and image-side surfaces to suppress an increase in manufacturing error sensitivity and contributes to compactness of the imaging lens. In addition, since it has at least one aspheric surface, it corrects spherical aberrations, astigmatism, and field curvature with higher effectiveness and controls the angle of a chief ray incident on the image sensor within an appropriate range.

Preferably, in the imaging lens according to the present invention, the third lens and the fourth lens are made of plastic material.

Since the third and fourth lenses are made of plastic material, the imaging lens can be supplied at lower price and it is easy to make an optimum aspheric shape on each lens surface, permitting better aberration correction.

Preferably, the imaging lens according to the present invention satisfies a conditional expression (3) below:

$$4.8 < f3/f < 10.0 \qquad (3)$$

where f denotes the focal length of the overall optical system of the imaging lens and f3 denotes the focal length of the third lens.

The conditional expression (3) defines an appropriate range for the ratio of the focal length of the third lens to the focal length of the overall optical system, and indicates a condition to ensure compactness of the imaging lens and correct off-axial aberrations, coma aberrations, and chromatic aberrations properly. The conditional expression (3) also indicates a condition to give telecentricity to light rays emitted from the third lens. If the value is above the upper limit of the conditional expression (3), the positive refractive power of the third lens would be too weak to properly correct off-axial aberrations, coma aberrations, and chromatic aberrations which occur on the first and second lenses, though it would reduce spherical aberrations occurred on the third lens. Also, in that case, it would be difficult to ensure compactness of the imaging lens and the telecentricity of emitted light rays would be insufficient, thus making it difficult for the fourth lens to control the angle of a chief ray incident on the image sensor appropriately. On the other hand, if the value is below the lower limit of the conditional expression (3), the positive refractive power of the third lens would be too strong to correct various aberrations properly, though it would be advantageous in ensuring compactness of the imaging lens. Also, in that case, spherical aberrations and coma aberrations on the third lens would increase, making it difficult to deliver high optical performance.

Preferably, the imaging lens according to the present invention satisfies a conditional expression (4) below:

$$1.6 < f4/f < 3.0 \qquad (4)$$

where f denotes the focal length of the overall optical system of the imaging lens and f4 denotes the focal length of the fourth lens.

The conditional expression (4) defines an appropriate range for the ratio of the focal length of the fourth lens to the focal length of the overall optical system, and indicates a condition to ensure compactness of the imaging lens, control the angle of a chief ray incident on the image sensor within an appropriate range and deliver high optical performance. If the value is above the upper limit of the conditional expression (4), the positive refractive power of the fourth lens would be too weak to ensure compactness of the imaging lens and control the angle of a chief ray incident on the image sensor within an appropriate range. Furthermore, it would be difficult to correct off-axial aberrations which occur on the concave lens group and spherical aberrations which occur on the third lens. On the other hand, if the value is below the lower limit of the conditional expression (4), the positive refractive power of the fourth lens would be too strong to control the angle of a chief ray incident on the image sensor within an appropriate range, though it would be advantageous in ensuring compactness of the imaging lens. In that case as well, it would be difficult to correct off-axial aberrations which occur on the concave lens group and spherical aberrations which occur on the third lens.

Preferably, the imaging lens according to the present invention satisfies a conditional expression (5) below:

$$14.4 < TTL/f < 24.4 \qquad (5)$$

where f denotes the focal length of the overall optical system of the imaging lens and TTL denotes the distance on the optical axis from the object-side surface of the first lens to the image plane (air conversion length for the filter).

The conditional expression (5) indicates a condition to ensure compactness of the imaging lens and an appropriate back focus. If the value is above the upper limit of the conditional expression (5), the total track length would be too long to ensure compactness of the imaging lens, though it would be advantageous in ensuring an appropriate back focus. On the other hand, if the value is below the lower limit of the conditional expression (5), the total track length would be too short to provide space for an insertion, such as a filter, though it would be advantageous in ensuring compactness of the imaging lens.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, and 9 are schematic views showing the general configurations of the imaging lenses in Examples 1 to 5 according to this embodiment, respectively. Since all these examples have the same basic lens configuration, the general configuration of an imaging lens according to this embodiment is explained below referring mainly to the schematic view of Example 1.

Figure 1:
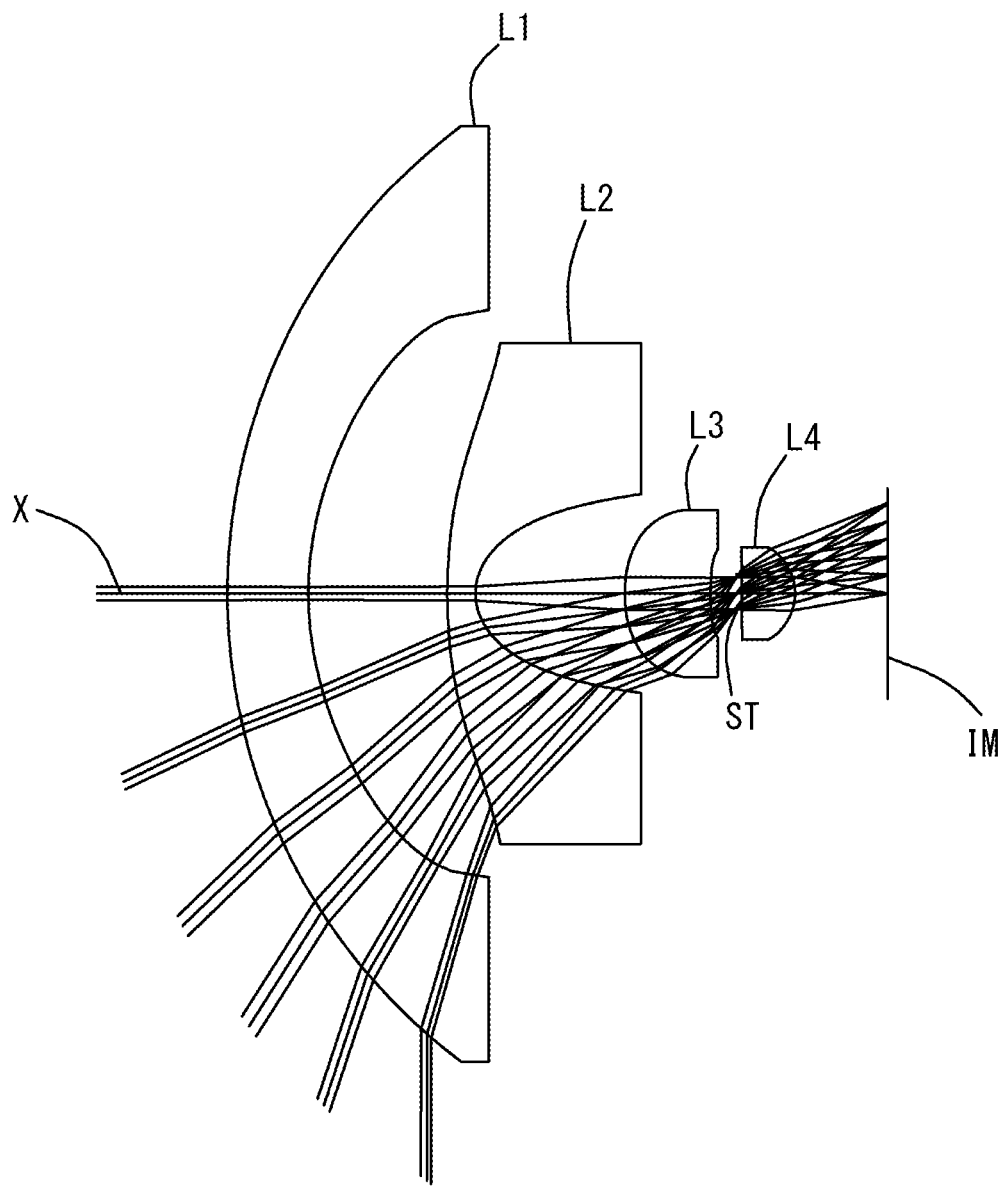
FIG. 1 is a schematic view showing the general configuration of an imaging lens in Example 1.

As shown in FIG. 1, the imaging lens according to this embodiment includes, in order from an object side to an image side, a first lens L1 with negative refractive power, a second lens L2 with negative refractive power, a third lens L3 with positive refractive power, an aperture stop ST, and a fourth lens L4 with positive refractive power.

In this embodiment, no filter is located between the fourth lens L4 and the image plane IM, though a filter such as an infrared cut filter or cover glass may be located there as necessary.

In the above imaging lens composed of four constituent lenses, the first lens L1 is a meniscus lens with negative refractive power having a convex surface on the object side. The object-side surface has a convex shape with a very small curvature to capture light rays incident from a wide range to provide a wide field of view. The image-side surface of the first lens L1 has an aspheric shape to minimize the angle of deviation of light rays on the first lens L1 and suppress off-axial aberrations. The first lens L1 may be a double-sided aspheric lens and in that case, it is easy to adjust the angle of deviation and suppress off-axial aberrations more effectively. In Example 2, the first lens L1 is a double-sided aspheric lens.

The second lens L2 is a meniscus lens with negative refractive power having a concave surface on the image side and, through its aspheric surfaces on the both sides, minimizes the angle of deviation of light rays over a wide range which have passed through the first lens L1 and suppresses off-axial aberrations before guiding the rays to the third lens L3. The second lens L2 is not limited to the above shape; for example, it may be a biconcave lens as shown in Example 5. If the second lens L2 is a biconcave lens, the negative refractive power can be distributed to the object-side surface and the image-side surface so as to lessen the curvature of the image-side surface, leading to higher lens formability.

The third lens L3 is a meniscus lens with positive refractive power having a concave surface on the image side. It contributes to compactness of the imaging lens, gives telecentricity to light rays passing through it, and guides the rays to the fourth lens L4. Through the aspheric surfaces on the both sides, it properly corrects off-axial aberrations, coma aberrations, and chromatic aberrations which occur on the first lens L1 and the second lens L2.

The fourth lens L4 is a biconvex lens with positive refractive power in which the object-side and image-side convex surfaces have strong positive refractive power to suppress increase in manufacturing error sensitivity and ensure compactness of the imaging lens. Through the aspheric surfaces on the both sides, it properly corrects off-axial aberrations which occur on the first lens L1 and the second lens L2 and spherical aberrations which occur on the third lens L3, and also controls the angle of a chief ray incident on the image sensor within an appropriate range.

As shown in FIG. 1, the aperture stop ST is located between the third lens L3 and the fourth lens L4 so that aberrations are corrected easily even though the imaging field of view is wide.

In the imaging lens according to this embodiment, although all the constituent lenses are made of plastic material, the above configuration helps to suppress off-axial aberrations on the concave lens group composed of the first lens L1 and the second lens L2, and reduces the burden on the convex lens group composed of the third lens L3 and the fourth lens L4 for correction of aberrations, thereby leading to high optical performance.

The lens material is not limited to plastics; if the imaging lens is expected to deliver higher performance or used in an environment in which there is a considerable temperature variation, glass material may be used for a lens which has the strongest refractive power. Also, depending on the required performance, each lens surface may be a spherical surface which is easy to form.

When the imaging lens according to this embodiment satisfies conditional expressions (1) to (5) below, it brings about advantageous effects:

$$-65.0 < f1/f < -17.0 \tag{1}$$

$$0.04 < f2/f1 < 0.14 \tag{2}$$

$$4.8 < f3/f < 10.0 \tag{3}$$

$$1.6 < f4/f < 3.0 \tag{4}$$

$$14.4 < TTL/f < 24.4 \tag{5}$$

where
f: focal length of the overall optical system of the imaging lens
f1: focal length of the first lens L1
f2: focal length of the second lens L2
f3: focal length of the third lens L3
f4: focal length of the fourth lens L4
TTL: distance on the optical axis X from the object-side surface of the first lens L1 to the image plane IM (air conversion length for the filter IR)

When the imaging lens according to this embodiment satisfies conditional expressions (1a) to (5a) below, it brings about more advantageous effects:

$$-56.0 < f1/f < -19.0 \tag{1a}$$

$$0.05 < f2/f1 < 0.13 \tag{2a}$$

$$5.4 < f3/f < 8.5 \tag{3a}$$

$$1.8 < f4/f < 2.7 \tag{4a}$$

$$16.0 < TTL/f < 22.5 \tag{5a}$$

In the above conditional expressions, the signs have the same meanings as those in the preceding paragraph.

When the imaging lens according to this embodiment satisfies conditional expressions (1b) to (5b) below, it brings about particularly advantageous effects:

$$-50.76 \leq f1/f \leq -21.63 \tag{1b}$$

$$0.06 \leq f2/f1 \leq 0.12 \tag{2b}$$

$$6.09 \leq f3/f \leq 7.64 \tag{3b}$$

$$2.03 \leq f4/f \leq 2.41 \tag{4b}$$

$$18.01 \leq TTL/f \leq 20.34 \tag{5b}$$

In the above conditional expressions, the signs have the same meanings as those in the paragraph before the preceding paragraph.

In this embodiment, the aspheric shapes of the constituent lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, ω denotes a half field of view, and ih denotes a maximum image height. i denotes a surface number counted from the object side, r denotes a curvature radius, d denotes the distance between lens surfaces on the optical axis (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

Example 1

The basic lens data of Example 1 is shown in Table 1 below.

TABLE 1

| Example 1 in mm |
|---|
| f = 0.659 |
| Fno = 2.85 |
| ω (°) = 90.0 |
| ih = 1.552 |

| Surface Data | | | | |
|---|---|---|---|---|
| Surface No. i | Curvature Radius r | Surface Distance d | Refractive Index Nd | Abbe Number vd |

TABLE 1-continued

Example 1
in mm

| | | | | |
|---|---|---|---|---|
| (Object Surface) | Infinity | Infinity | | |
| 1 | 10.026 | 1.381 | 1.5438 | 55.57 |
| 2* | 5.681 | 2.374 | | |
| 3* | 10.163 | 0.481 | 1.5438 | 55.57 |
| 4* | 0.989 | 2.547 | | |
| 5* | 2.217 | 1.467 | 1.6142 | 25.58 |
| 6* | 6.586 | 0.445 | | |
| 7 (Stop) | Infinity | 0.090 | | |
| 8* | 19.927 | 0.910 | 1.5438 | 55.57 |
| 9* | −0.840 | 1.576 | | |
| Image Plane | Infinity | | | |

Constituent Lens Data

| Lens | Start Surface | Focal Length |
|---|---|---|
| 1 | 1 | −27.147 |
| 2 | 3 | −2.053 |
| 3 | 5 | 4.823 |
| 4 | 8 | 1.505 |

Aspheric Surface Data

| | 2nd Surface | 3rd Surface | 4th Surface | 5th Surface |
|---|---|---|---|---|
| k | 3.710E−01 | 2.844E+00 | −1.064E+00 | 1.392E+00 |
| A4 | −1.376E−03 | 3.348E−03 | 6.572E−07 | 1.578E−02 |
| A6 | 3.816E−06 | −4.216E−03 | −4.427E−03 | 1.346E−03 |
| A8 | −6.615E−07 | 1.448E−05 | 8.278E−03 | 1.936E−03 |
| A10 | 7.620E−08 | −1.493E−07 | 7.623E−04 | 2.729E−03 |
| A12 | −3.616E−09 | −2.682E−09 | 7.365E−05 | −5.264E−04 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 6th Surface | 8th Surface | 9th Surface |
|---|---|---|---|
| k | 4.845E+01 | −7.730E+01 | −8.447E−01 |
| A4 | 1.314E−01 | −1.851E−01 | −3.011E−02 |
| A6 | 1.502E−01 | −8.097E−01 | −3.166E−02 |
| A8 | 4.177E−01 | −5.157E+00 | −1.031E−01 |
| A10 | −2.076E+00 | −4.587E+00 | −2.208E−01 |
| A12 | 2.321E+00 | 1.592E+02 | −3.834E−01 |
| A14 | −1.070E−09 | −1.104E+01 | 0.000E+00 |
| A16 | 0.000E+00 | 0.000E+00 | 0.000E+00 |

As shown in Table 6 below, the imaging lens in Example 1 satisfies all the conditional expressions (1) to (5).

Figure 2:
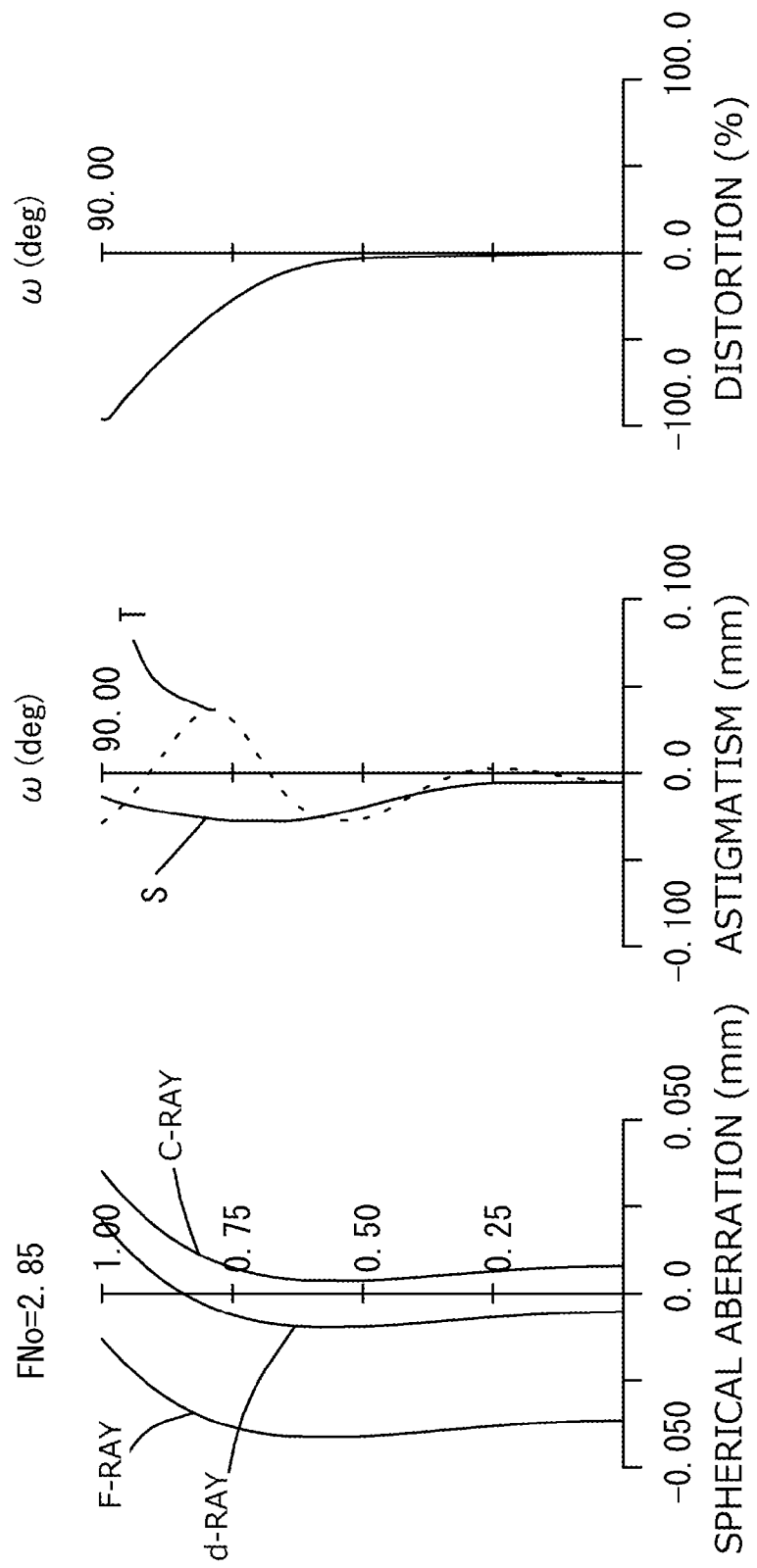
FIG. 2 shows spherical aberration, astigmatism, and distortion of the imaging lens in Example 1.
Figure 3:
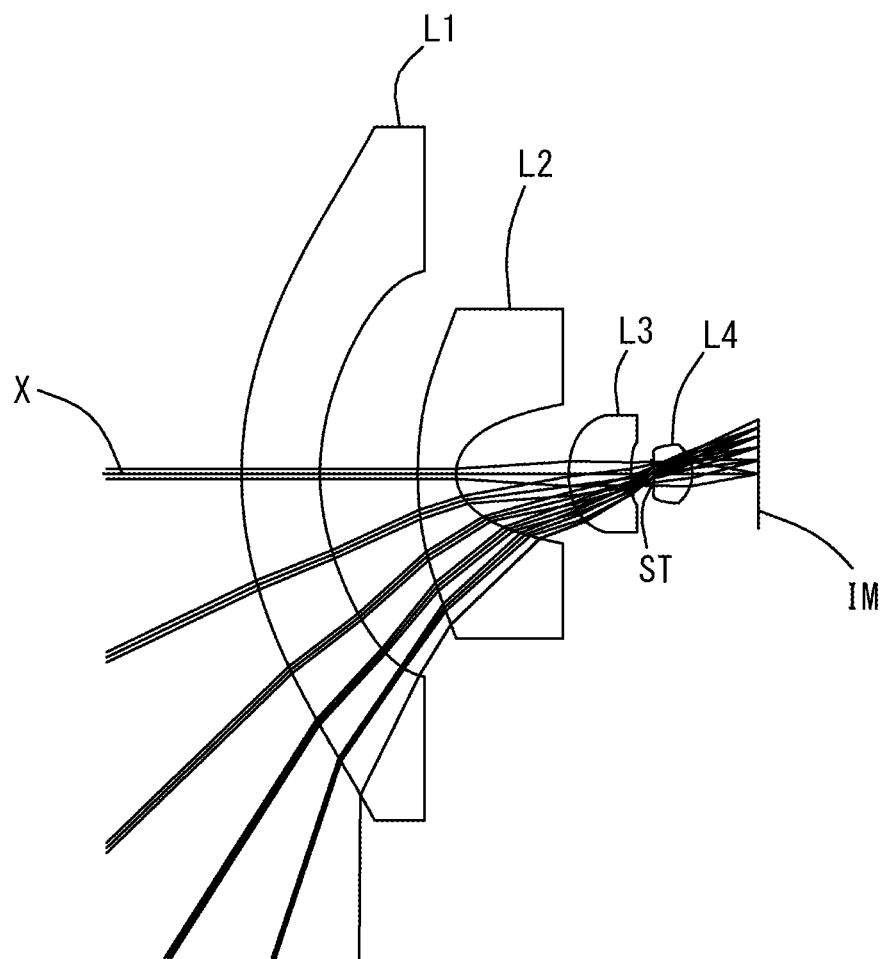
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration on sagittal image surface S at d-ray and the amount of aberration on tangential image surface T at d-ray (the same is true for FIGS. 4, 6, and 8). As shown in FIG. 2, each aberration is corrected properly.

Since all the constituent lenses are made of plastic material, the imaging lens can be supplied at a low price. The field of view is about 180 degrees and the total track length TTL is about 11 mm, suggesting that the imaging lens is compact.

Example 2

The basic lens data of Example 2 is shown below in Table 2.

TABLE 2

Example 2
in mm f = 0.679
Fno = 2.79
ω (°) = 90.0
ih = 1.290

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 9.181 | 1.852 | 1.5438 | 55.57 |
| 2* | 5.724 | 2.312 | | |
| 3* | 9.984 | 0.904 | 1.5438 | 55.57 |
| 4* | 0.973 | 2.660 | | |
| 5* | 2.192 | 1.475 | 1.6142 | 25.58 |
| 6* | 6.176 | 0.468 | | |
| 7 (Stop) | Infinity | 0.070 | | |
| 8* | 39.518 | 0.904 | 1.5438 | 55.57 |
| 9* | −0.827 | 1.568 | | |
| Image Plane | Infinity | | | |

Constituent Lens Data

| Lens | Start Surface | Focal Length |
|---|---|---|
| 1 | 1 | −34.458 |
| 2 | 3 | −2.056 |
| 3 | 5 | 4.849 |
| 4 | 8 | 1.501 |

Aspheric Surface Data

| | 1st Surface | 2nd Surface | 3rd Surface | 4th Surface |
|---|---|---|---|---|
| k | −4.681E−01 | 3.945E−01 | 2.906E+00 | −9.950E−01 |
| A4 | −8.607E−05 | −1.668E−03 | 3.577E−03 | 7.645E−02 |
| A6 | −2.080E−06 | 2.804E−06 | −4.182E−04 | 7.663E−04 |
| A8 | 0.000E+00 | −5.987E−07 | 1.455E−05 | 7.659E−03 |
| A10 | 0.000E+00 | 7.830E−08 | −1.495E−07 | 5.291E−05 |
| A12 | 0.000E+00 | −3.663E−09 | −2.806E−09 | −1.967E−04 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 8th Surface | 9th Surface |
|---|---|---|---|---|
| k | 1.409E+00 | 4.645E+01 | 0.000E+00 | −8.027E−01 |
| A4 | 1.569E−02 | 1.237E−01 | −1.900E−01 | −3.969E−02 |
| A6 | 2.914E−03 | 1.467E−01 | −7.157E−01 | −5.662E−02 |
| A8 | 2.313E−03 | 4.567E−01 | −4.589E+00 | −1.053E−01 |
| A10 | 2.647E−03 | −1.948E+00 | −3.261E+00 | −1.670E−01 |
| A12 | −6.132E−04 | 2.483E+00 | 1.542E+02 | −2.172E−01 |
| A14 | 0.000E+00 | −1.278E−01 | −1.665E+02 | 0.000E+00 |
| A16 | 0.000E+00 | 0.000E+00 | 0.000E+00 | 0.000E+00 |

As shown in Table 6 below, the imaging lens in Example 2 satisfies all the conditional expressions (1) to (5).

Figure 4:
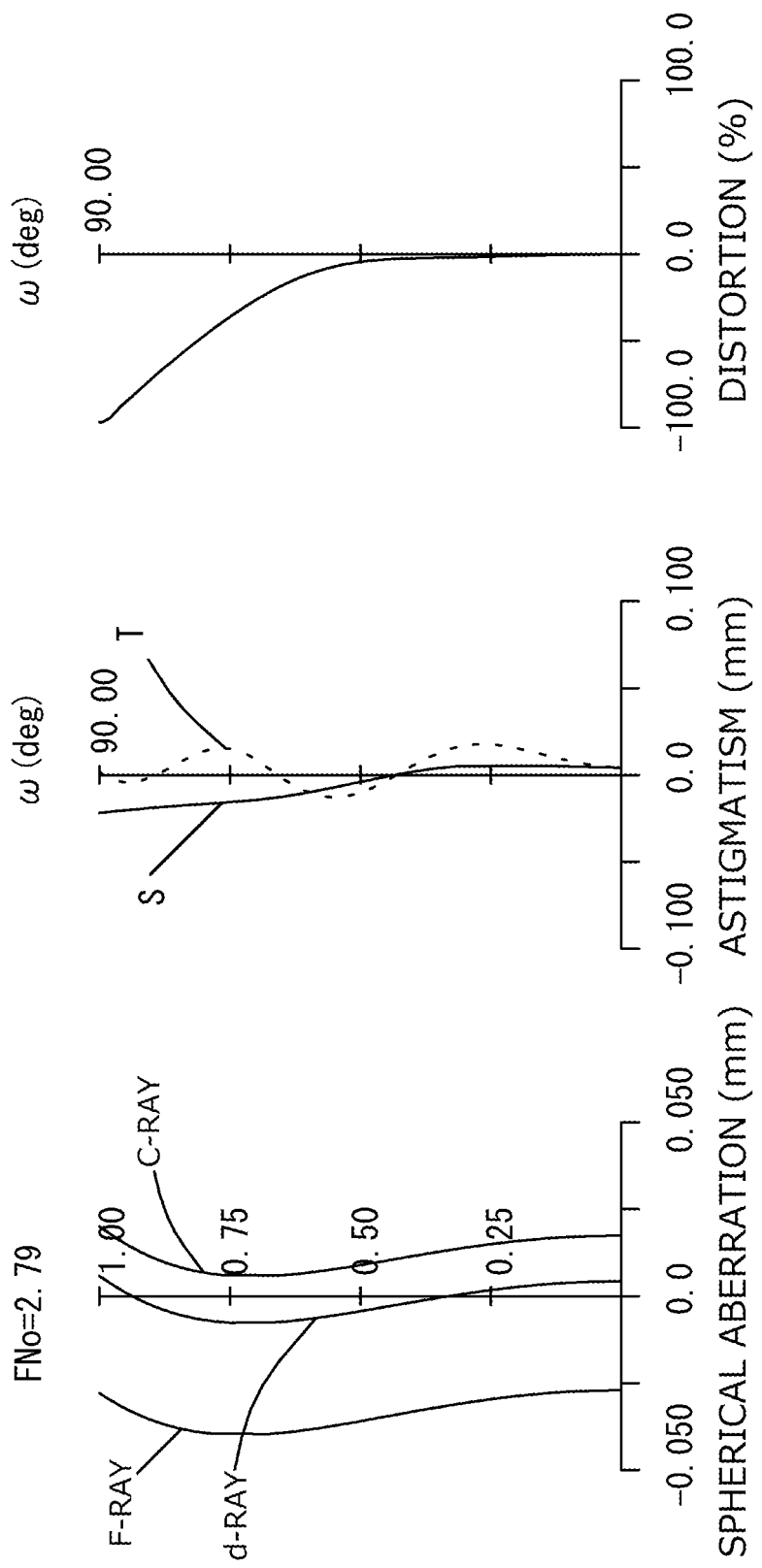
FIG. 4 shows spherical aberration, astigmatism, and distortion of the imaging lens in Example 2.
Figure 5:
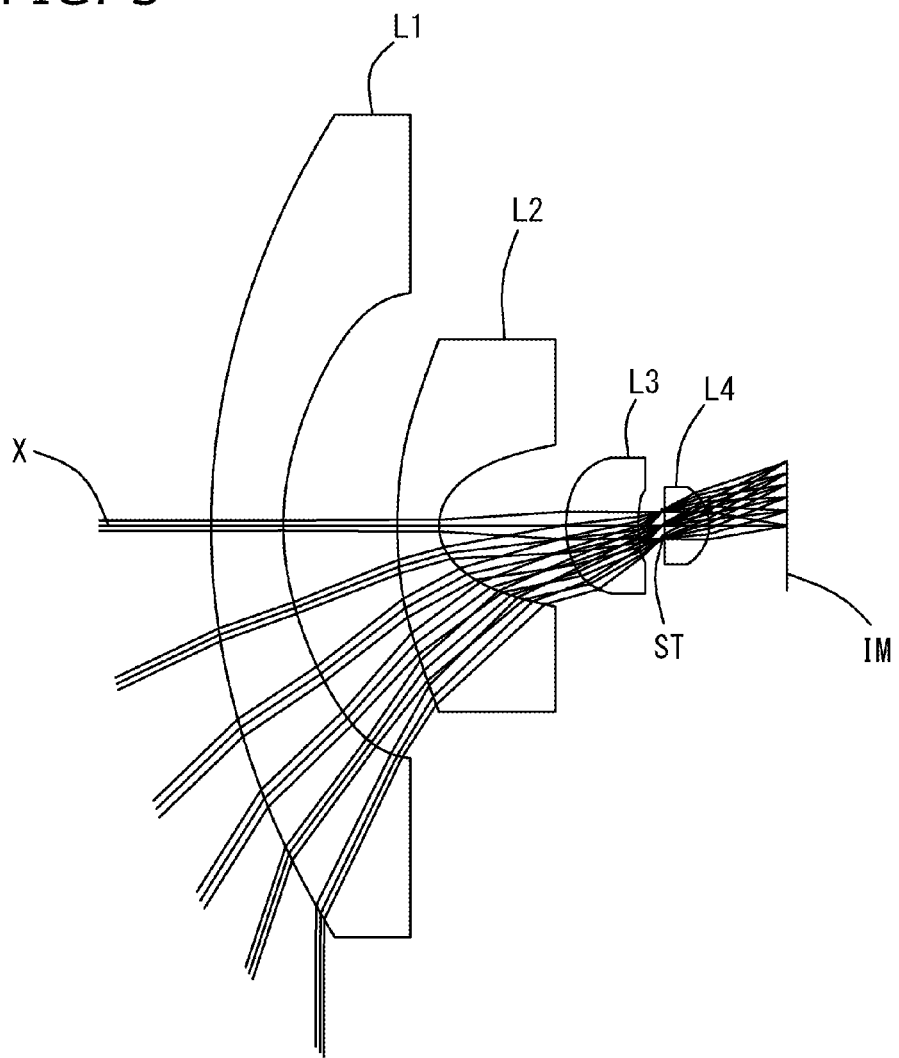
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

Since all the constituent lenses are made of plastic material, the imaging lens can be supplied at a low price. The field of view is about 180 degrees and the total track length TTL is about 12 mm, suggesting that the imaging lens is compact.

Example 3

The basic lens data of Example 3 is shown below in Table 3.

TABLE 3

Example 3
in mm f = 0.626
Fno = 2.86
ω (°) = 89.6
ih = 1.313

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 | 14.424 | 1.472 | 1.5438 | 55.57 |
| 2* | 5.702 | 2.324 | | |
| 3* | 9.991 | 0.852 | 1.5438 | 55.57 |
| 4* | 1.015 | 2.588 | | |
| 5* | 2.193 | 1.478 | 1.6142 | 25.58 |
| 6* | 6.423 | 0.478 | | |
| 7 (Stop) | Infinity | 0.061 | | |
| 8* | 23.806 | 0.903 | 1.5438 | 55.57 |
| 9* | −0.840 | 1.584 | | |
| Image Plane | Infinity | | | |

Constituent Lens Data

| Lens | Start Surface | Focal Length |
|---|---|---|
| 1 | 1 | −18.433 |
| 2 | 3 | −2.149 |
| 3 | 5 | 4.785 |
| 4 | 8 | 1.512 |

Aspheric Surface Data

| | 2nd Surface | 3rd Surface | 4th Surface | 5th Surface |
|---|---|---|---|---|
| k | 4.276E−01 | 2.937E+00 | −1.068E+00 | 1.458E+00 |
| A4 | −1.679E−03 | 3.450E−03 | 7.515E−02 | 1.636E−02 |
| A6 | −8.670E−07 | −4.193E−04 | −4.103E−03 | 4.456E−03 |
| A8 | −6.639E−07 | 1.455E−05 | 8.355E−03 | 2.394E−03 |
| A10 | 7.987E−08 | −1.470E−07 | 3.959E−04 | 2.706E−03 |
| A12 | −3.450E−09 | −2.540E−09 | −1.212E−04 | −5.899E−04 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 6th Surface | 8th Surface | 9th Surface |
|---|---|---|---|
| k | 5.639E+01 | 0.000E+00 | −8.260E−01 |
| A4 | 1.363E−01 | −2.086E−01 | −3.340E−02 |
| A6 | 1.682E−01 | −8.477E−01 | −6.119E−02 |
| A8 | 4.825E−01 | −4.918E+00 | −1.110E−01 |
| A10 | −1.939E+00 | −1.820E+00 | −1.362E−01 |
| A12 | 2.452E+00 | 2.464E+02 | −5.222E−02 |
| A14 | −4.488E−01 | 1.414E+03 | 0.000E+00 |
| A16 | 0.000E+00 | 0.000E+00 | 0.000E+00 |

As shown in Table 6 below, the imaging lens in Example 3 satisfies all the conditional expressions (1) to (5).

Figure 6:
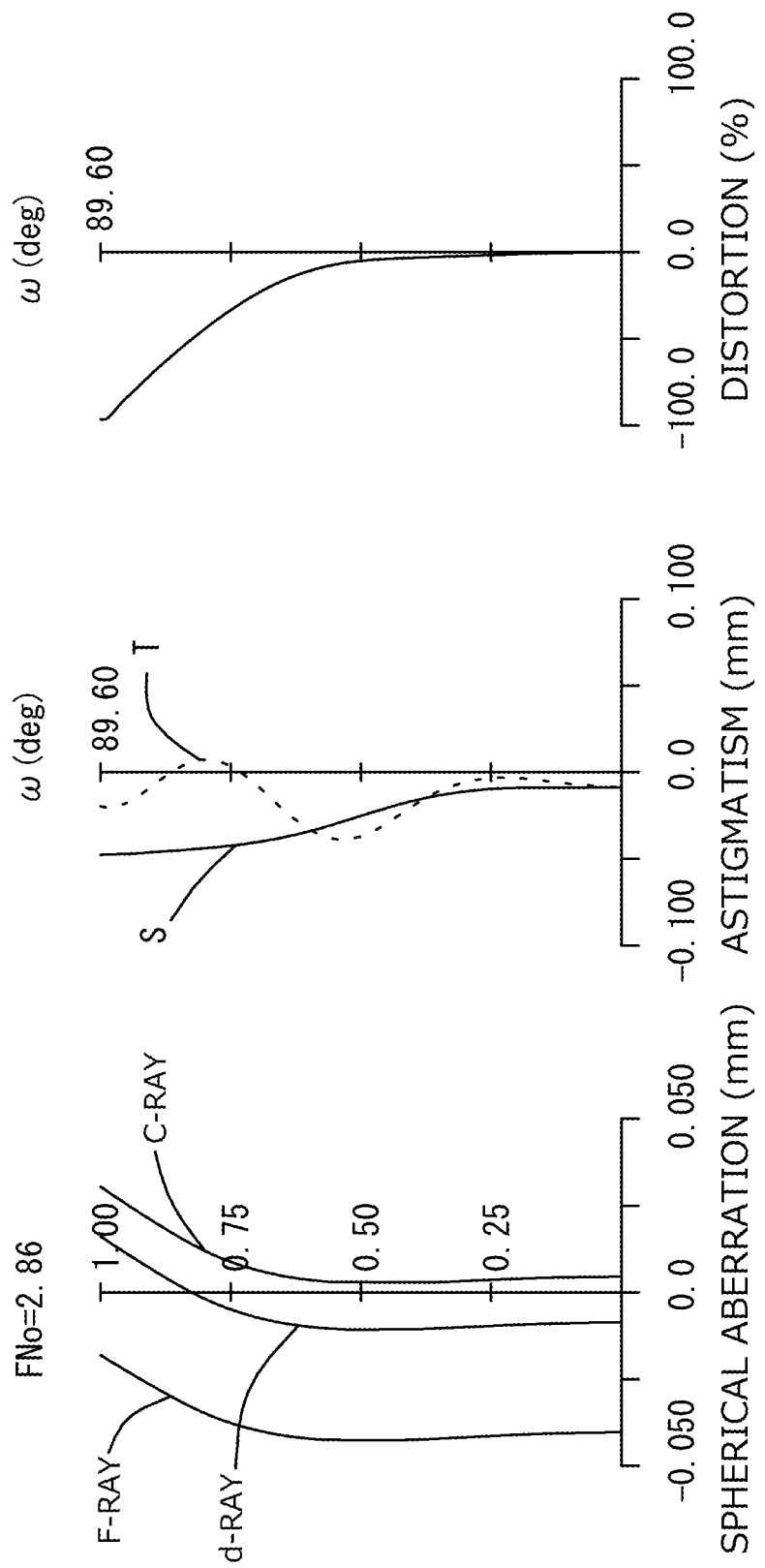
FIG. 6 shows spherical aberration, astigmatism, and distortion of the imaging lens in Example 3.
Figure 7:
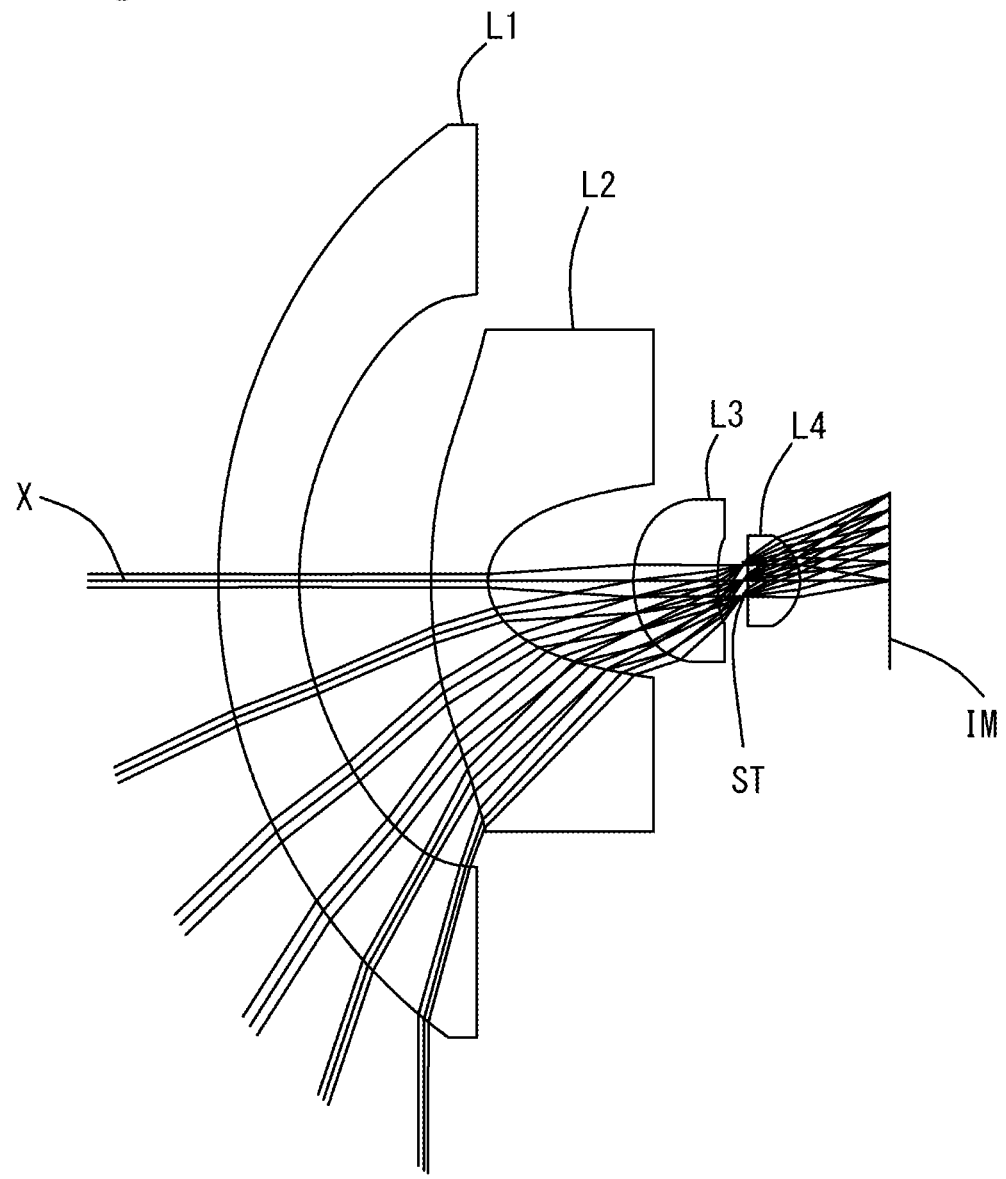
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

Since all the constituent lenses are made of plastic material, the imaging lens can be supplied at a low price. The field of view is about 180 degrees and the total track length TTL is about 12 mm, suggesting that the imaging lens is compact.

Example 4

The basic lens data of Example 4 is shown below in Table 4.

TABLE 4

Example 4
in mm f = 0.666
Fno = 2.83
ω (°) = 90.0
ih = 1.536

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 | 10.003 | 1.417 | 1.5438 | 55.57 |
| 2* | 5.747 | 2.308 | | |
| 3* | 10.135 | 0.996 | 1.5438 | 55.57 |
| 4* | 0.988 | 2.545 | | |
| 5* | 2.209 | 1.475 | 1.6142 | 25.58 |
| 6* | 6.632 | 0.443 | | |
| 7 (Stop) | Infinity | 0.086 | | |
| 8* | 20.845 | 0.910 | 1.5346 | 56.16 |
| 9* | −0.824 | 1.560 | | |
| Image Plane | Infinity | | | |

Constituent Lens Data

| Lens | Start Surface | Focal Length |
|---|---|---|
| 1 | 1 | −28.138 |
| 2 | 3 | −2.094 |
| 3 | 5 | 4.784 |
| 4 | 8 | 1.505 |

Aspheric Surface Data

| | 2nd Surface | 3rd Surface | 4th Surface | 5th Surface |
|---|---|---|---|---|
| k | 3.086E−01 | 2.864E+00 | −1.020E+00 | 1.399E+00 |
| A4 | −1.283E−03 | 3.359E−03 | 6.895E−02 | 1.583E−02 |
| A6 | 5.380E−06 | −4.212E−04 | −4.266E−03 | 2.227E−03 |
| A8 | −6.120E−07 | 1.450E−05 | 8.205E−03 | 2.037E−03 |
| A10 | 7.734E−08 | −1.485E−07 | 7.095E−04 | 2.696E−03 |
| A12 | −3.619E−09 | −2.638E−09 | 6.159E−05 | −5.580E−04 |
| A14 | 0.000E+00 | 4.354E−14 | −4.335E−08 | 4.944E−08 |
| A16 | 0.000E+00 | 0.000E+00 | 0.000E+00 | 0.000E+00 |

| | 6th Surface | 8th Surface | 9th Surface |
|---|---|---|---|
| k | 4.808E+01 | 0.000E+00 | −8.290E−01 |
| A4 | 1.307E−01 | −1.894E−01 | −3.338E−02 |
| A6 | 1.503E−01 | −7.988E−01 | −3.931E−02 |
| A8 | 4.193E−01 | −4.945E+00 | −1.041E−01 |
| A10 | −2.076E+00 | −3.142E+00 | −2.165E−01 |
| A12 | 2.312E+00 | 1.721E+02 | −3.700E−01 |
| A14 | −6.316E−02 | −5.738E+00 | 0.000E+00 |
| A16 | 0.000E+00 | 0.000E+00 | 0.000E+00 |

As shown in Table 6 below, the imaging lens in Example 4 satisfies all the conditional expressions (1) to (5).

Figure 8:
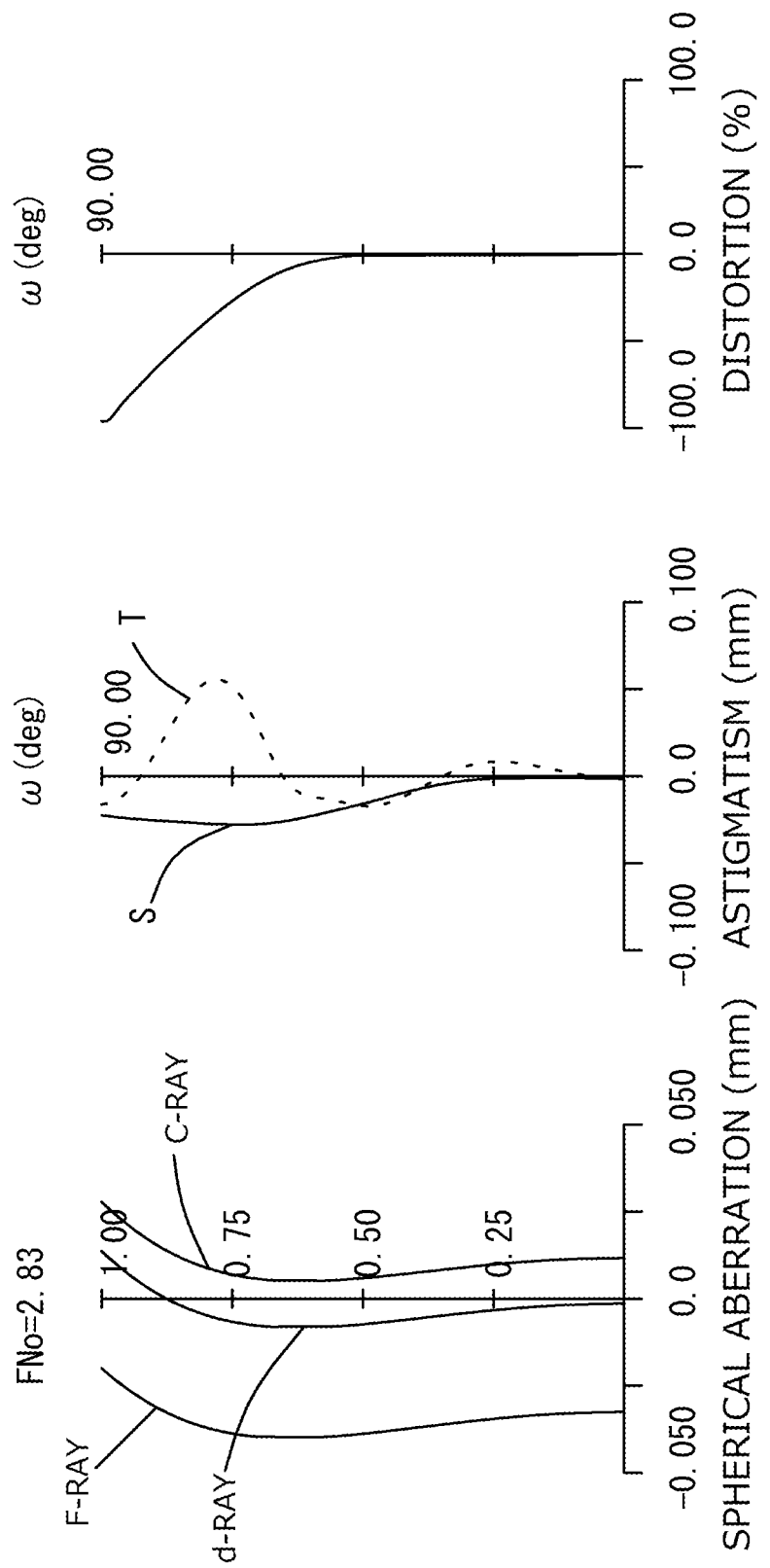
FIG. 8 shows spherical aberration, astigmatism, and distortion of the imaging lens in Example 4.
Figure 9:
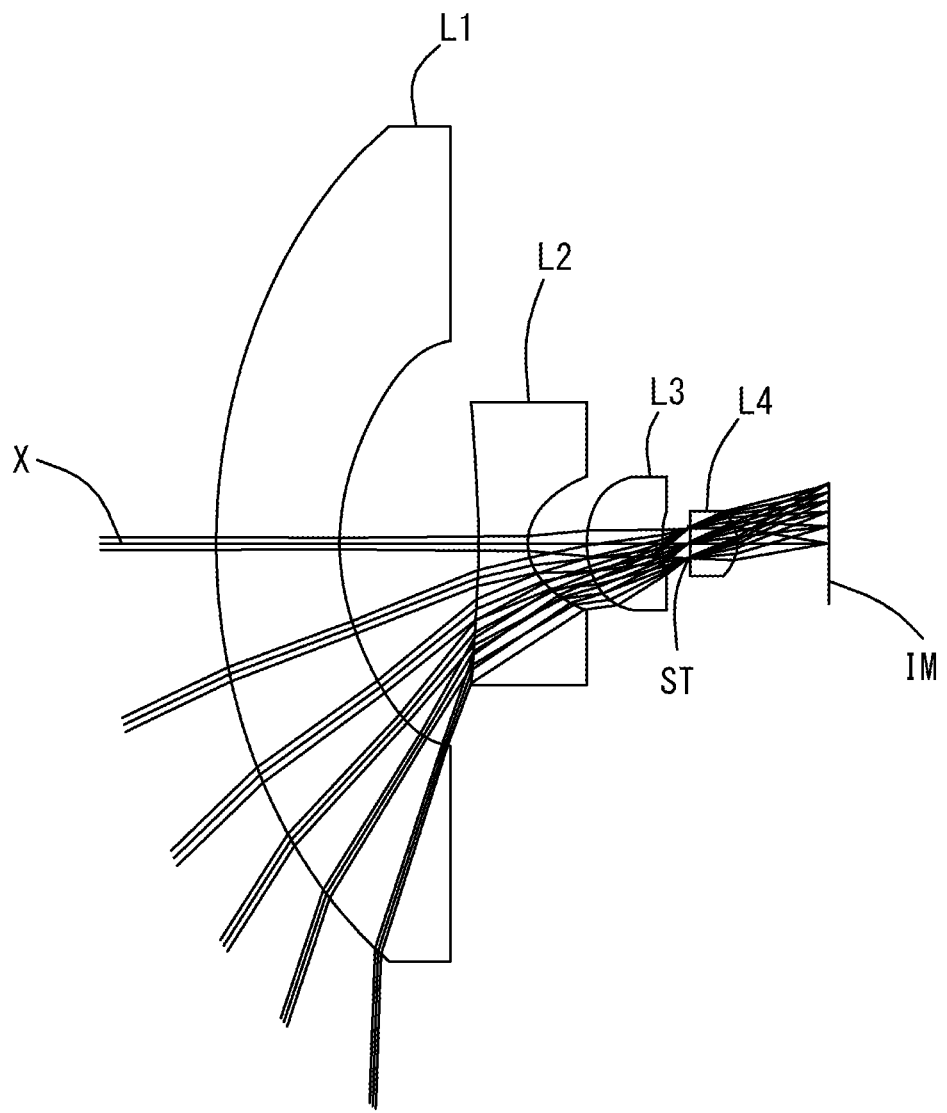
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

Since all the constituent lenses are made of plastic material, the imaging lens can be supplied at a low price. The field of view is about 180 degrees and the total track length TTL is about 12 mm, suggesting that the imaging lens is compact.

Example 5

The basic lens data of Example 5 is shown below in Table 5.

TABLE 5

Example 5
in mm f = 0.744
Fno = 2.89
ω (°) = 90.0
ih = 1.238

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 | 13.134 | 2.500 | 1.5438 | 55.57 |
| 2* | 4.902 | 2.811 | | |
| 3* | −15.401 | 0.996 | 1.5438 | 55.57 |
| 4* | 1.052 | 1.200 | | |
| 5* | 2.126 | 1.530 | 1.6142 | 25.58 |
| 6* | 6.536 | 0.514 | | |
| 7 (Stop) | Infinity | 0.046 | | |
| 8* | 24.196 | 0.952 | 1.5346 | 56.16 |
| 9* | −0.824 | 1.855 | | |
| Image Plane | Infinity | | | |

Constituent Lens Data

| Lens | Start Surface | Focal Length |
|---|---|---|
| 1 | 1 | −16.104 |
| 2 | 3 | −1.773 |

TABLE 5-continued

Example 5
in mm

| 3 | 5 | 4.530 |
| 4 | 8 | 1.510 |

Aspheric Surface Data

| | 2nd Surface | 3rd Surface | 4th Surface | 5th Surface |
|---|---|---|---|---|
| k | 3.987E−01 | 0.000E+00 | −1.100E+00 | 1.450E+00 |
| A4 | −2.061E−03 | 4.149E−03 | 8.604E−07 | 2.769E−07 |
| A6 | −2.307E−05 | −4.070E−04 | −6.471E−03 | 4.121E−03 |
| A8 | −1.110E−06 | 1.467E−05 | 7.255E−03 | 2.481E−03 |
| A10 | 8.778E−08 | −1.549E−07 | 4.529E−04 | 2.742E−03 |
| A12 | −5.933E−09 | −2.619E−09 | −2.496E−05 | −6.073E−04 |
| A14 | 0.000E+00 | 3.365E−10 | 1.957E−05 | 3.038E−05 |
| A16 | 0.000E+00 | 0.000E+00 | 0.000E+00 | 0.000E+00 |

| | 6th Surface | 8th Surface | 9th Surface |
|---|---|---|---|
| k | 6.048E+01 | 0.000E+00 | −8.426E−01 |
| A4 | 1.422E−01 | −1.881E−01 | −2.977E−02 |
| A6 | 1.738E−01 | −4.987E−01 | −7.484E−02 |
| A8 | 3.796E−01 | −4.318E+00 | −3.769E−02 |
| A10 | −1.921E+00 | −1.606E+01 | 6.827E−04 |
| A12 | 3.264E+00 | 2.056E+02 | 2.233E−01 |

TABLE 5-continued

Example 5
in mm

| A14 | −9.407E−02 | 4.198E+03 | 0.000E+00 |
| A16 | 0.000E+00 | 0.000E+00 | 0.000E+00 |

As shown in Table 6 below, the imaging lens in Example 5 satisfies all the conditional expressions (1) to (5).

Figure 10:
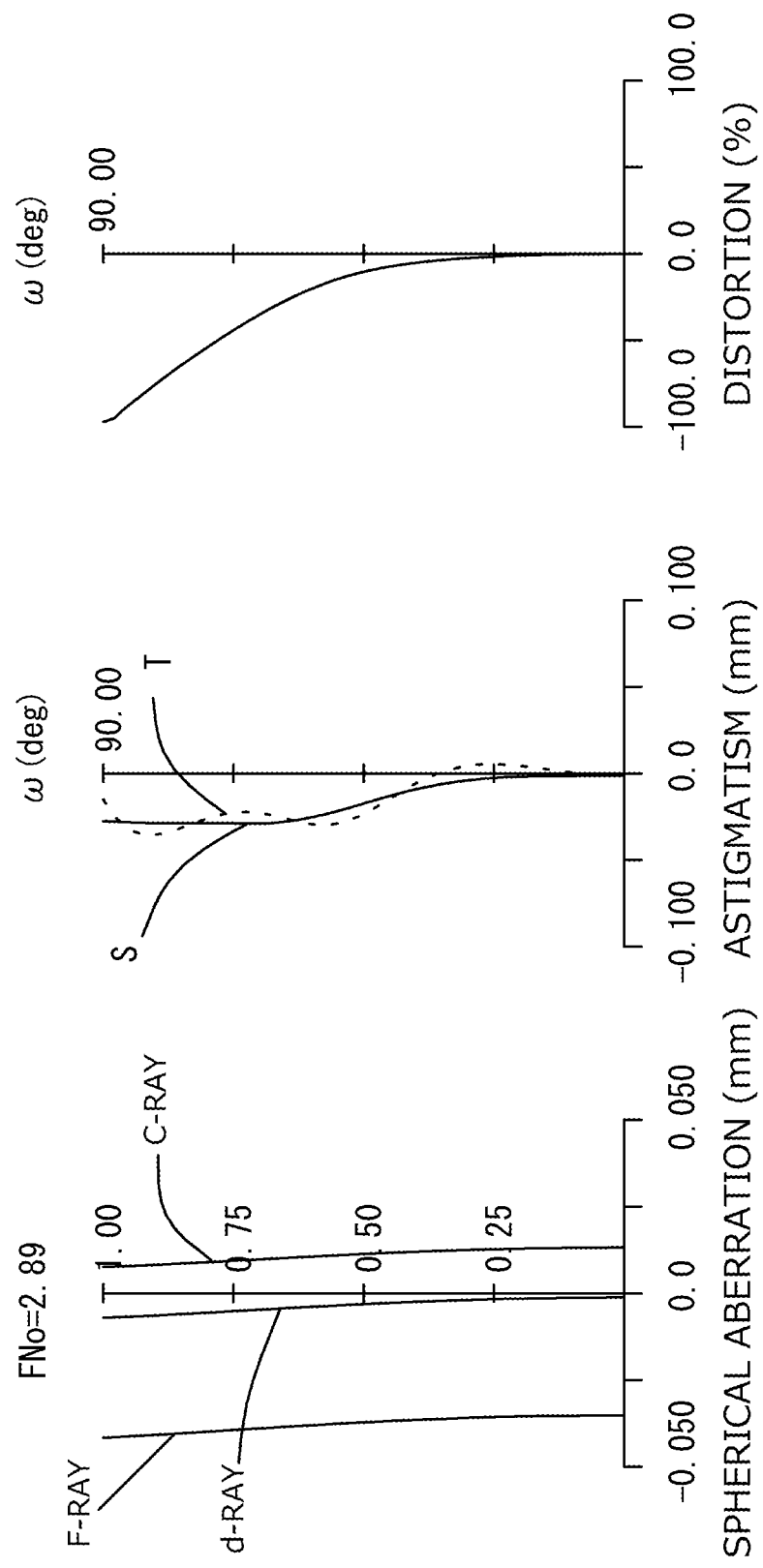
FIG. 10 shows spherical aberration, astigmatism, and distortion of the imaging lens in Example 5.

FIG. 10 shows spherical aberration (mm), astigmatism (mm), and distortion (%) of the imaging lens in Example 5. As shown in FIG. 10, each aberration is corrected properly.

Since all the constituent lenses are made of plastic material, the imaging lens can be supplied at a low price. The field of view is about 180 degrees and the total track length TTL is about 12 mm, suggesting that the imaging lens is compact.

As explained above, the imaging lens according to the preferred embodiment of the present invention provides an optical system which features low price, high optical performance and compactness (total track length TTL of 13 mm or less) and offers a field of view of about 180 degrees.

Table 6 shows data on Examples 1 to 5 in relation to the conditional expressions (1) to (5).

TABLE 6

| | Example 1 | Example 2 | Example 3 | Example 4 | Example 5 |
|---|---|---|---|---|---|
| Conditional Expression (1) $-65.0 < f1/f < -17.0$ | −41.18 | −50.76 | −29.43 | −42.25 | −21.63 |
| Conditional Expression (2) $0.04 < f2/f1 < 0.14$ | 0.08 | 0.06 | 0.12 | 0.07 | 0.11 |
| Conditional Expression (3) $4.8 < f3/f < 10.0$ | 7.32 | 7.14 | 7.64 | 7.18 | 6.09 |
| Conditional Expression (4) $1.6 < f4/f < 3.0$ | 2.28 | 2.21 | 2.41 | 2.26 | 2.03 |
| Conditional Expression (5) $14.4 < TTL/f < 24.4$ | 18.61 | 19.47 | 20.34 | 19.13 | 18.01 |

According to the present invention, there is provided a compact imaging lens composed of four constituent lenses which features low price and high optical performance and offers a wide field of view of about 180 degrees. In particular, it can be applied to image pickup devices which are mounted in in-vehicle cameras, game consoles, security cameras, information terminals such as PCs, and home appliances with a camera function.

The effects of the present invention are as follows.

According to the present invention, there is provided a compact low-priced imaging lens which offers a field of view of about 180 degrees and delivers high optical performance.

What is claimed is:

1. An imaging lens in which elements are arranged in order from an object side to an image side, comprising:
a first lens having negative refractive power, a convex surface on the object side, and an aspheric surface on the image side;
a second lens as a double-sided aspheric lens having negative refractive power and a concave surface on the image side;
a third lens having positive refractive power;
an aperture stop; and a fourth lens having positive refractive power,
wherein the first lens and the second lens are made of plastic material; and
conditional expressions (1b), (2b), (3b), (4b), and (5b) below are satisfied:

$$-50.76 \leq f1/f \leq -21.63 \quad (1b)$$

$$0.06 \leq f2/f1 \leq 0.12 \quad (2b)$$

$$6.09 \leq f3/f \leq 7.64 \quad (3b)$$

$$2.03 \leq f4/f \leq 2.41 \quad (4b)$$

$$18.01 \leq TTL/f \leq 20.34 \quad (5b)$$

where
f: focal length of an overall optical system of the imaging lens
f1: focal length of the first lens
f2: focal length of the second lens
f3: focal length of the third lens
f4: focal length of the fourth lens
TTL: distance on an optical axis from the object side surface of the first lens to an image plane.

2. The imaging lens according to claim 1,
wherein
the third lens is a meniscus lens with at least one aspheric surface having a concave surface on the image side; and
the fourth lens is a biconvex lens with at least one aspheric surface having a convex surface on the object side and the image side.

3. The imaging lens according to claim 1,
wherein the third lens and the fourth lens are made of plastic material.

* * * * *